United States Patent [19]

Chen et al.

[11] Patent Number: 4,500,417
[45] Date of Patent: Feb. 19, 1985

[54] CONVERSION OF FISCHER-TROPSCH PRODUCTS

[75] Inventors: Nai Y. Chen, Titusville; Werner O. Haag; Tracy J. Huang, both of Lawrenceville, all of N.J.; Stephen S. Wong, Langhorne, Pa.

[73] Assignee: Mobil Oil Corporation, New York, N.Y.

[21] Appl. No.: 453,970

[22] Filed: Dec. 28, 1982

[51] Int. Cl.³ .............................................. C10G 47/20
[52] U.S. Cl. ..................................... 208/111; 208/950
[58] Field of Search ........................ 208/111, 120, 950

[56] References Cited

U.S. PATENT DOCUMENTS 3,480,539 11/1969 Voorhies, Jr. et al. .............. 208/111
3,507,931 4/1970 Morris et al. ......................... 585/739
3,923,641 12/1975 Morrison ............................... 208/111
4,044,063 8/1977 Ireland et al. .......................... 208/79
4,071,574 1/1978 Milstein et al. ........................ 208/79
4,125,566 11/1978 Dinh et al. .......................... 208/17 X
4,133,841 1/1979 Cosyns et al. ........................ 208/113
4,234,412 11/1980 Boersma et al. ...................... 208/80
4,238,318 12/1980 Kouwenhoven et al. ........... 208/120
4,309,275 1/1982 Mulaskey .............................. 208/109
4,423,265 12/1983 Chu et al. ............................. 585/322

Primary Examiner—Delbert E. Gantz
Assistant Examiner—O. Chaudhuri
Attorney, Agent, or Firm—Alexander J. McKillop; Michael G. Gilman; Dennis P. Santini

[57] ABSTRACT

The high boiling fraction of Fischer-Tropsch synthesis is upgraded by contact with a catalyst comprising a high-silica, large pore zeolite and a hydrogenation component. The products are a distillate fraction characterized by low sulfur and nitrogen content, high isoparaffin content and low pour point and a lube fraction characterized by its high viscosity index and low pour point.

16 Claims, No Drawings

CONVERSION OF FISCHER-TROPSCH PRODUCTS

FIELD OF THE INVENTION

This invention relates to the conversion of Fischer-Tropsch heavy end products and more particularly to the conversion of Fischer-Tropsch heavy end products into low pour point distillates and lubricants of high viscosity index.

BACKGROUND OF THE INVENTION

Processes for the production of synthetic hydrocarbon fuels and lubricants from synthesis gas, a mixture of hydrogen and carbon monoxide, have been known for some time and, of them, the Fischer-Tropsch process is probably the best known. An account of the development of the process and its more notable characteristics are given in Kirk-Othmer, Encylopedia of Chemical Technology, Third Edition, John Wiley & Sons, New York 1980, Vol. 11, pp. 473–478 in the article on Synthetic Fuels. In the Fischer-Tropsch process, synthesis gas is passed over a catalyst at elevated temperature and pressure to produce a number of carbon monoxide reduction products including hydrocarbons, alcohols, fatty acids and other oxygenated compounds. In favorable circumstances, the oxygenated materials will comprise less than 1 percent of the total liquid product. The hydrocarbon product is highly paraffinic in nature and typically includes hydrocarbon gas, light olefins, gasoline, light and heavy fuel oils and waxy gas oils. Because the higher boiling fractions in the product are generally too waxy for general use either as liquid fuels or lubricants, further processing is normally necessary before they can be used, either as such or by being added to the general pool of products. Upgrading processes of various kinds are described, for example, in U.S. Pat. Nos. 4,125,566, 4,133,841 and 4,234,412 and in these processes a high boiling fraction is subjected to cracking followed by other processes such as hydrotreating in order to remove residual quantities of oxygenated materials and to increase the yield of gasoline boiling range products. U.S. Pat. No. 4,071,574 describes a process for improving the quality of the high boiling fraction, the decant oil being subjected in this case to an initial hydrogenation to saturate olefinics and to remove oxygenates, especially organic acids, after which the higher boiling materials are treated with a catalyst such as ZSM-5 to produce a material with acceptable pour point. A similar process is described in U.S. Pat. No. 4,044,064 in which the hydrotreated Fischer-Tropsch product is fractionated and the kerosone fraction together with the heavy oil fraction boiling above about 345° C. (650° F.) is upgraded using a ZSM-5 type catalyst. In the upgrading process described in U.S. Pat. No. 4,080,397, a mixture of light oil and higher boiling decant oil is first hydrogenated and then fractionated to form a light fraction and a heavy fraction which is subjected to selective cracking. A similar process is described in U.S. Pat. No. 4,044,063. U.S. Pat. No. 4,046,829 describes a process in which the fractionated synthesis product boiling above about 200° C. (400° F.) is first hydrogenated and then treated with a ZSM-5 type catalyst to obtain a product of lower pour point.

SUMMARY OF THE INVENTION

It has now been discovered that certain highly siliceous, large pore zeolites may advantageously be used to convert the higher boiling products of Fischer-Tropsch synthesis to low pour point distillates and lubricants of high viscosity index (VI).

According to the present invention, the heavy end products of Fischer-Tropsch synthesis are converted over a catalyst comprising a highly siliceous, large pore zeolite and a hydrogenation component, usually a metal or metals of Groups VA, VIA, VIIA, or VIIIA of the Periodic Table (the Periodic Table used in this specification is the table approved by IUPAC and the U.S. National Bureau of Standards and shown, for example, in the Periodic Chart of the Fisher Scientific Company, Catalog No. 5-702-10). The zeolite has a silica:alumina ratio of at least 10:1, preferably above 30:1 and even higher ratios e.g. 100:1, 250:1 are preferred. Highly siliceous zeolites having the structures of zeolites Y, ZSM-20 and zeolite beta are particularly suitable.

DETAILED DESCRIPTION

Feedstock

The feed for the present conversion process is obtained by means of the Fischer-Tropsch synthesis, in which synthesis gas, comprising hydrogen and carbon monoxide is passed over a suitable catalyst under conditions of elevated temperature and pressure. The catalyst used is typically a metal or a metal oxide, with iron, cobalt, nickel, ruthenium, thorium, rhodium or osmium being preferred. In most cases, cobalt will be used as the metal. Temperatures are typically in the range of 150° C. to 500° C. (about 300° F. to 930° F.) and pressures of 1 to 1000 Atm. Further details of the process and of suitable apparatus for carrying it out will be found in Kirk-Othmer, Synthetic Fuels, op cit and U.S. Pat. Nos. 4,046,829, 4,044,063, 4,044,064, 4,059,648, 4,080,397, 4,071,574, 4,052,477, 4,045,505, 4,046,830, 4,041,094, 4,041,095 and 4,049,741, to which reference is made for such details.

In a typical Fischer-Tropsch operation, the synthesis gas obtained, for example, from coal by means of a suitable gasifier, is introduced into the Fischer-Tropsch converter where the carbon monoxide reduction reactions take place to form the synthesis product comprising hydrocarbons and various oxygenates such as alcohols and acids. The conversion over the Fischer-Tropsch catalyst may take place either over a fixed bed of the catalyst or in a fluidized bed of catalyst, as described in U.S. Pat. No. 4,046,829. Generally, the synthesis gas feed will be introduced at a temperature of at least 150° C. (about 300° F.) and at a pressure of at least 800 kPa (about 100 psig); during the conversion the temperature of the reactants will rise due to the exothermic nature of the reaction. The products of the reaction are then cooled and a preliminary separation of the products made. A physical separation of the products will normally lead to a decant oil stream comprising oil free of catalyst and a slurry oil stream comprising oil mixed with entrained particles of the catalyst. After the oil has been separated from the catalyst in the slurry oil stream, the oil can be combined with the decant oil for fractionation. The separation made at this stage will depend upon the nature of the synthesis product and the subsequent processing steps but typically, a light oil boiling below 250° C. (about 480° F.) and a higher boiling heavy oil can be obtained. The fractionation cut points may, of course, be adjusted as desired, as is conventional. The light oil may be treated subsequently by further cooling and washing and by other processing steps such as clay treatment and washing, as described, for example, in U.S. Pat. No. 4,046,829, which may then be followed by further separation of heavy ends by fractionation. The heavy ends so obtained may be mixed with the other heavy oil fractions which may be treated by the present upgrading process.

Whatever specific synthesis steps may be used, the present upgrading process employs a heavy oil fraction obtained from Fischer-Tropsch synthesis. This fraction is generally in the distillate boiling range or above and therefore may be characterized as having an initial boiling point of at least 150° C. (about 300° F.), although in some cases, materials of low boiling point (about 125° C.) may be included in this fraction. Preferably, the Fischer-Tropsch heavy oil fraction will have an initial boiling point above 174° C. and more preferably 343° C. (about 650° F.) since the use of a gas oil offers the possibility of producing both a distillate and a lubricating oil product. These heavy oil fractions will contain a high proportion of paraffins which give them their waxy character and in addition will contain olefins together with oxygenated compounds such as alcohols, carboxylic acids, esters and other compounds. If desired, the heavy oil fraction may be washed prior to upgrading in order to remove water soluble oxygenated compounds but if this is done, the residual water content should be reduced to an adequately low level if the catalyst used in the upgrading step is sensitive to steam. The fraction may also be passed through a guard Chamber to remove contaminants associated with the conversion of the synthesis gas.

Catalyst

The catalyst used in the present process comprises a large pore crystalline zeolite as the acidic component and a hydrogenation-dehydrogenation component supported on the zeolite. The hydrogenation-dehydrogenation component which is used is a metal component which may be either a noble metal or a base metal. Suitable metals are selected from Group VIIIA of the Periodic Table, including the noble metals platinum, palladium, iridium, osmium, rhodium and ruthenium and non-noble metals such as iron, cobalt and nickel and also from Groups VA, VIA, VIIA, IB, IIB and IVB including vanadium, molybdenum, tungsten, silver, gold and rhenium. Combinations of metals such as cobalt-molybdenum, nickel-tungsten, platinum-iridium, platinum-rhenium, platinum-iridium-rhenium are especially favored.

The metal component may be incorporated into the support by any suitable method such as impregnation or exchange onto the zeolite. The metal may be incorporated in the form of a cationic, anionic or neutral complex such as $Pt(NH_3)_4^{2+}$ and cationic complexes of this type will be found convenient for exchanging metals onto the zeolite. Anionic complexes such as the vanadate or metatungstate ions and chloroplatinic acid are useful for impregnating metals into the zeolites.

The amount of the hydrogenation-dehydrogenation component is suitably from 0.01 to 10 percent by weight, normally 0.1 to 5 percent by weight, although this will, of course, vary with the nature of the component, less of the highly active noble metals being required than of the less active base metals.

The metal component may be presulfided in the conventional way by treatment with a sulfiding gas such as hydrogen sulfide, preferably diluted with an inert gas e.g. 8%–12% $H_2S$ in He at elevated temperature e.g. 100° C.–500° C. to bring the metal component into the more active sulfide form.

The support for the metal component comprises a crystalline zeolite having pores at least 6 Angstroms in diameter and a silica:alumina ratio of at least 10:1.

Silica:alumina ratios higher than 10:1, especially those higher than 50:1, may be used to advantage. As will be described below, it is possible to obtain large pore zeolites such as zeolites Y, beta and ZSM-20 with silica:alumina ratios well above 10:1 or even 50:1, for example, 100:1, 250:1 or even higher.

The silica:alumina ratios referred to in this specification are the structural or framework ratios, that is, the ratio for the $SiO_4$ to the $AlO_4$ tetrahedra which together constitute the structure of which the zeolite is composed. This ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain treatments such as the dealuminization methods described below which result in the presence of ionic aluminum free of the zeolite structure are employed. Due care should therefore be taken to ensure that the framework silica:alumina ratio is correctly determined.

Consistent with the pore size limitation, the zeolite should also have a Constraint Index less than 2.0, preferably 0.5 to less than 2.0. The significance of Constraint Index is as follows.

Zeolites have a crystal structure which is capable of regulating the access to an egress from the intracrystalline free space. This control, which is effected by the crystal structure itself, is dependent both upon the molecular configuration of the material which is or, alternatively, is not, to have access to the internal structure of the zeolite and also upon the structure of the zeolite itself. The pores of the zeolite are in the form of rings which are formed by the regular disposition of the tetrahedra making up the anionic framework of the crystalline aluminosilicate, the oxygen atoms themselves being bonded to the silicon or aluminum atoms at the centers of the tetrahedra. A convenient measure of the extent to which a zeolite provides this control for molecules of varying sizes to its internal structure is provided by the Constraint Index of the zeolite: zeolites which provide but highly restricted access to and egress from the internal structure have a high value for the Constraint Index and zeolites of this kind usually have pores of small size. Contrariwise, zeolites which provide relatively free access to the internal zeolite structure have a low value for the Constraint Index. The method by which Constraint Index is determined is described fully in U.S. Pat. No. 4,016,218 to which reference is made for details of the method together with examples of Constraint Index for some typical zeolites. Because Constraint Index is related to the crystalline structure of the zeolite but is nevertheless determined by means of a test which exploits the capacity of the zeolite to engage in a cracking reaction, that is, a reaction dependent upon the possession of acidic sites and functionality in the zeolite, the sample of zeolite used in the test should be representative of zeolitic structure whose Constraint Index is to be determined and should also possess requisite acidic functionality for the test. Acidic functionality may, of course, be varied by conventional artifices including base exchange, steaming or control of silica:alumina ratio.

The preferred zeolites have a hydrocarbon sorption capacity of at least 5, and preferably at least 6, percent for n-hexane. The hydrocarbon sorption capacity is determined by measuring the sorption at 25° C., 20 mm Hg. (2666 Pa) hydrocarbon pressure in an inert carrier such as helium.

Hydrocarbon sorption capacity (%) =

$$\frac{\text{Wt. of hydrocarbon sorbed}}{\text{Wt. of Zeolite}} \times 100$$

The sorption test is conveniently carried out by thermogravimetric analysis with helium as a carrier gas flowing over the zeolite at 25° C. The hydrocarbon of interest, e.g., n-hexane is introduced into the gas stream adjusted to 20 mm Hg hydrocarbon pressure and the hydrocarbon uptake, measured as the increase in zeolite weight is recorded. The sorption capacity may then be calculated as a percentage, mentioned above.

Zeolites which have the requisite pore size and which may be obtained with a suitably high silica:alumina ratio include zeolite Y, zeolite beta, mordenite and zeolites ZSM-3, ZSM-4, ZSM-18 and ZSM-20. Dealuminized forms of zeolite Y are also highly useful materials.

If the zeolite selected may be produced in the desired highly siliceous form by direct synthesis, this will often be the most convenient method for obtaining it. Zeolite beta, for example, is known to be capable of being synthesized directly in forms having silica:alumina ratios up to 100:1, as described in U.S. Pat. Nos. 3,308,069 and Re. 28,341 which describe zeolite beta, its preparation and properties in detail and reference is made to these patents for these details. Zeolite Y, on the other hand, can be synthesized only in forms which have silica:alumina ratios up to about 5:1 and in order to achieve higher ratios, resort may be made to various techniques to remove structural aluminum so as to obtain a more highly siliceous zeolite. The same is true of mordenite which, in its natural or directly synthesized form has a silica:alumina ratio of about 10:1. Zeolite ZSM-20 may be directly synthesized with silica:alumina ratios of 7:1 or higher, typically in the range of 7:1 to 10:1, as described in U.S. Pat. Nos. 3,972,983 and 4,021,331 to which reference is made for details of this zeolite, its preparation and properties. Zeolite ZSM-20 also may be treated by various methods to increase its silica:alumina ratio. Zeolites ZSM-3 and ZSM-18 are described in U.S. Pat. Nos. 3,415,736 and 3,950,496 to which reference is made for details of these zeolites, their preparation and properties.

Control of the silica:alumina ratio of the zeolite in its as-synthesized form may be exercised by an appropriate selection of the relative proportions of the starting materials, especially the silica and alumina precursors, a relatively smaller quantity of the alumina precursor resulting in a higher silica:alumina ratio in the product zeolite, up to the limit of the synthetic procedure. If higher ratios are desired and alternative syntheses affording the desired high silica:alumina ratios are not available, other techniques such as those described below may be used in order to prepare the desired highly siliceous zeolites.

A number of different methods are known for increasing the structural silica:alumina ratio of various zeolites. Many of these methods rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the methods: Catalysis by Zeolites (International Symposium on Zeolites, Lyon, Sept. 9-11, 1980), Elsevier Scientific Publishing Co., Amsterdam, 1980 (dealuminization of zeolite Y with silicon tetrachloride); U.S. Pat. No. 3,442,795 and G.B. Pat. No. 1,058,188 (hydrolysis and removal of aluminum by chelation); G.B. Pat. No. 1,061,847 (acid extraction of aluminum); U.S. Pat. No. 3,493,519 (aluminum removal by steaming and chelation): U.S. Pat. No. 3,591,488 (aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions): U.S. Pat. No. 3,506,400 (steaming followed by chelation): U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-contrary gases at high temperatures) NL Pat. No. 7,604,264 (acid extraction), JA Pat. No. 53,101,003 (treatment with EDTA or other materials to remove aluminum) and J. Catalysis 54 295 (1978) (hydrothermal treatment followed by acid extraction).

Because of their convenience and practicality the preferred dealuminization methods for preparing the present highly siliceous zeolites are those which rely upon acid extraction of the aluminum from the zeolite. It has been found that zeolite beta may be readily dealuminized by acid extraction and details of a suitable method are given in U.S. patent application Ser. No. 379,399, filed May 18, 1982, by R. B. LaPierre and S. S. Wong, entitled "High Silica Zeolite Beta". Reference is made to that application for details of the method.

Highly siliceous forms of zeolite Y may be readily prepared by acid extraction of structural aluminum but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication Society of Chemical Engineering (London) Monograph Molecular Sieves, page 186 (1968) by C. V. McDaniel and P. K. Maher, and reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite. The acid extraction may be made in the same way as described above for zeolite beta.

Other methods for increasing the silica:alumina ratio of zeolite Y by acid extraction are described in U.S. Pat. Nos. 4,218,307, 3,591,488 and 3,691,099, to which reference is made for details of these methods.

Zeolite ZSM-20 may be converted to more highly siliceous forms by a process similar to that used for zeolite Y: first, the zeolite is converted to an "ultrastable" form which is then dealuminized by acid extraction. The conversion to the ultrastable form may suitably be carried out by the same sequence of steps used for preparing ultrastable Y. The zeolite is successively base-exchanged to the ammonium form and calcined, normally at temperatures above 700° C. The calcination should be carried out in a deep bed in order to impede removal of gaseous products, as recommended in Advances in Chemistry Series, No. 121, op cit. Acid extraction of the "ultrastable" ZSM-20 may be effected in the same way as described above for zeolite beta.

A preferred method of preparing highly siliceous forms of zeolites Y and ZSM-20 is described in U.S. patent application Ser. No. 379,424, filed May 18, 1982 by R. B. LaPierre, R. D. Partridge and P. T. Reischman and entitled "Method for Preparing Acid Stable Zeolites", to which reference is made for details of the method.

Highly siliceous forms of mordenite may be made by acid extraction procedures of the kind described, for example, in U.S. Pat. Nos. 3,691,099, 3,591,488 and other dealuminization techniques which may be used for mordenite are disclosed, for example, in U.S. Pat. Nos. 4,273,753, 3,493,519 and 3,442,795. Reference is made to these patents for full descriptions of these procedures.

The zeolite supports used in the present process have a silica:alumina ratio (structural) of at least 10:1 and preferably greater than 50:1. Ratios above 100:1 e.g., 250:1, 1000:1, 1600:1 or even higher may provide especially good results.

It may be desirable to incorporate the catalyst in another material resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calcination, acid treatment or chemical modification.

The catalyst may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely with the zeolite content ranging from between 1 to 99, more usually 5 to 80 percent by weight of the composite.

Process Conditions

The feedstock is contacted with the catalyst in the presence of hydrogen under conditions of elevated temperature and pressure. The conditions used e.g. temperature, pressure, space velocity and hydrogen ratio, may be similar to those used in conventional hydrocracking operations although the use of the more highly siliceous zeolite catalysts may permit the total pressure requirements to be reduced and the absence of polycyclic aromatic materials in the feedstock will preclude the normal hydrocracking reactions from taking place.

Process temperatures of 200° C. to 500° C. (about 400° F. to 930° F.) may conveniently be used although temperatures above 425° C. (800° F.) will normally not be employed. Generally, temperatures of 300° C. to 425° C. (570° F. to 800° F.) will be employed. Total pressure is usually in the range of 500 to 20,000 kPa (58 to 2886 psig) and the higher pressures within this range over 7000 kPa (986 psig) will normally be preferred. The process is operated in the presence of hydrogen and hydrogen partial pressures will normally be from 600 to 6000 kPa (72 to 2305 psig). The ratio of hydrogen to the hydrocarbon feedstock (hydrogen circulation rate) will normally be from 10 to 3500 n.l.l.$^{-1}$ (56 to 19,660 SCF/bbl). The space velocity of the feedstock will normally be from 0.1 to 20 LHSV, preferably 0.1 to 10 LHSV.

During the reaction, substantial conversion to lower boiling products, especially those in the distillate range (165°–343° C., 330°–650° F.) takes place. Naphtha and dry gas may also be produced in substantial amounts. At the same time, however, the n-paraffins present in the feed and those produced by cracking are subjected to isomerization, depending upon the nature of the catalyst. Although all the preferred highly siliceous large pore zeolites will produce a certain degree of isomerization to the less waxy iso-paraffins, resulting in a lower pour point for the product, it has been found that the highly siliceous forms of zeolite beta are the most effective in this respect. The forms of zeolite beta with silica:alumina ratios of at least 30:1 and preferably over 100:1, are preferred for this reason. It has also been found that the present catalysts not only promote the conversion of the feed to lower boiling products but also bring about a reduction in the pour point of the feed, thereby producing a material which, by reason of its lower pour point and good viscosity index (attributable to its highly paraffinic nature), is highly suitable as a lubricating oil base. The reduction in the n-paraffin content may be perceived not only in the conversion products, i.e. the 343° C.− products in the case of a gas oil feedstock, but also in the unconverted residues. It therefore follows that a gas oil (343° C.+ feed) will produce a low pour point distillate (343° C.−) product but also a low pour point lube stock (345° C.+) product which has a high VI. The unconverted high boiling fractions (above 343° C.) may, if desired, be recycled.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity. The catalyst may be regenerated by contact at elevated temperature with hydrogen gas, for example, or by burning in air or other oxygen-containing gas.

Because certain hydrogenation components in the catalyst such as nickel, cobalt or molybdenum are more active in the sulfide forms, they are generally used as such and in conventional hydrocracking processes using feedstocks of petroliferous origin they will be maintained in the desired condition by the sulfur content of the feed. However, the synthetic feeds of Fischer-Tropsch synthesis are relatively low in sulfur, typically 30-50 ppmw and unless the feed is sulfided by the addition of a suitable sulfiding compound, the sulfided catalyst will revert to a less active form. It may therefore be desirable when using a pre-sulfided hydrocracking catalyst, to add a sulfiding compound providing sulfur in an amount from 20 to 250 ppmw in the feed.

Products

The distillate boiling range products which may be obtained by the present upgrading process are characterized by a high content of isoparaffins and a very low content of sulfur- and nitrogen-containing compounds. Because of the high isoparaffin content, the pour point (ASTM D-97) of the distillate products will normally be below −18° C. (about 0° F.) and in most cases below −45° C. (about −50° F.). In addition, these products are extremely low in aromatics so that they are highly suitable as premium quality jet fuels. Their high Cetane Index will also make them good diesel fuels, a utility which is, of course, enhanced by their low sulfur content.

The higher boiling fractions (343° C.+) which are obtained from the upgrading process are also highly paraffinic materials which confers a high viscosity index (ASTM D-2270) upon them, making them highly desirable lubricant base stocks. However, because the paraffins are present mainly as isoparaffins, the product will have a low pour point in addition to the desired high viscosity index. In general, the pour point will be below 0° C. (32° F.) and in most cases below −18° C. (about 0° F.). Viscosity Indices will normally be above 75 and may even be as high as 90, 100 or even higher.

The present process is therefore notable for its ability to upgrade Fischer-Tropsch heavy fractions to produce both distillate and lubricant products which are notable for their low pour point and their minimal content of heterocyclic (nitrogen and sulfur) compounds. The process may be operated under conditions of high severity to increase the proportionate yield of distillate range product, if this is desired or, alternatively, the proportion of lube product may be maximized by operation under low severity conditions. By suitable choice of operating conditions, both distillate and lube products may be obtained.

The invention is illustrated by the following Examples in which all parts, proportions and percentages are by weight unless stated to the contrary. Examples 1-5 below illustrate the preparation of the highly siliceous zeolite catalysts and Example 6 their use.

EXAMPLE 1

A sample of ZSM-20 in its as-synthesized form as Na-TEA-ZSM-20 (TEA=tetraethylammonium) and having a silica:alumina ratio of 7.47:1 was ammonium exchanged twice using 1M ammonium chloride solution at reflux for about 1 hour, followed by washing with distilled water and drying at 100° C. The dried zeolite was calcined in a steam/air atmosphere (100 ml min.$^{-1}$ air saturated with water at 95° C.), with the temperature increasing from 30° C. to 500° C. at a rate of 2.5° C. min.$^{-1}$, followed by 2 hours at 500° C. When cool, the calcined zeolite was treated with 0.1N hydrochloric acid for 1 hour at 20° C., washed with distilled water and then ammonium exchanged for 1 hour at 80° C. with 1M ammonium chloride, again followed by washing. The silica:alumina ratio of the dealuminized zeolite obtained by this procedure was found to be 47.9:1 by TGA-NH$_3$ titration.

EXAMPLE 2

The dealuminized NH$_4$ZSM-20 prepared by the procedure described in Example 1 was steam calcined in air saturated with water at 95° C. using a heating rate of 2.5° C. min.$^{-1}$ over the temperature range of 30° C. to 500° C. and a rate of 0.25° C. min.$^{-1}$ over the range of 500° C. to 700° C. The calcined zeolite was extracted after cooling using 0.1N hydrochloric acid at 80° C. for 1 hour, followed by washing with distilled water. The extracted zeolite was then calcined in air at 500° C. for 4 hours to remove residual acid and was then ammonium exchanged using 1M ammonium chloride solution at 80° C., followed by washing.

The silica:alumina ratio of the dealuminized zeolite prepared in this way was found to be 231.6 by TGA-NH$_3$ titration. The alpha activity of the zeolite was 10.4.

EXAMPLE 3

A portion of the dealuminized zeolite prepared by the procedure of Example 2 was subjected to an additional acid extraction with 2.0N hydrochloric acid for 1 hour at 80° C. prior to calcining in air at 500° C. followed by a final ammonium exchange with 1M ammonium chloride solution at 80° C. for 1 hour.

The extensively dealuminized NH$_4$ZSM-20 prepared in this way had a silica:alumina ratio of about 13,600:1 by NH$_3$ exchange (1879:1 by TGA-NH$_3$ adsorption after purging at 150° C. with helium saturated with water). The alpha activity of the zeolite was 0.44. The zeolite was found to have retained about 71 percent crystallinity relative to the parent zeolite.

EXAMPLE 4

This Example illustrates the preparation of a catalyst based on zeolite beta.

A mixture of zeolite beta (SiO$_2$/Al$_2$O$_3$=30) having a crystallite size of less than 0.05 microns and an equal amount gamma alumina on an anhydrous basis was extruded to form 1.5 mm. pellets. The pellets were calcined at 540° C. in nitrogen, magnesium exchanged, and then calcined in air.

One hundred grams of the air-calcined extrudate was impregnated with 13.4 grams of ammonium metatungstate (72.3%W) in 60 cc of water, followed by drying at 115° C. and calcination in air at 540° C. The extrudate was then impregnated with 15.1 grams of nickel hexahydrate in 60 cc of water, and the wet pellets dried and calcined at 540° C.

The final catalyst had a nickel content of about 4 weight percent as NiO and a calculated tungsten content of about 10.0 weight percent as $WO_3$. The sodium content was less than 0.5 weight percent as sodium oxide.

EXAMPLE 5

This example describes the preparation of high silica zeolite beta.

A sample of zeolite beta in its as synthesized form and having a silica:alumina ratio of 30:1 was calcined in flowing nitrogen at 500° C. for 4 hours, followed by air at the same temperature for 5 hours. The calcined zeolite was then refluxed with 2N hydrochloric acid at 95° C. for one hour to produce a dealuminized, high silica form of zeolite beta having a silica:alumina ratio of 280:1, an alpha value of 20 and a crystallinity of 80 percent relative to the original, assumed to be 100 percent crystalline.

The zeolite was exchanged to the ammonium form with 1N ammonium chloride solution at 90° C. reflux for an hour followed by the exchange with 1N magnesium chloride solution at 90° C. reflux for an hour. Platinum was introduced into the zeolite by ion-exchange of the tetrammine complex at room temperature. The metal exchanged zeolite was thoroughly washed and oven dried by air calcination at 350° C. for 2 hours. The finished catalyst contained 0.6 percent platinum and was pelleted, crushed and sized to 30–40 mesh (Tyler) (approx. 0.35 to 0.5 mm).

EXAMPLE 6

The Pt-beta catalyst of Example 5 containing 0.6 percent platinum was used for the upgrading of a Fischer-Tropsch heavy oil boiling above 343° C. (650° F.). The process was carried out at 371° C. (700° F.) and 3550 kPa (500 psig), 1 LHSV, with a hydrogen circulation rate of 800 n.l.l.$^{-1}$ (4500 SCF/bbl). The results are shown in Table 1 below.

TABLE 1

| Conversion of Fischer-Tropsch Heavy Oil | | |
|---|---|---|
| | Feed | Product |
| $C_1$–$C_4$ | — | 7.8 |
| $C_5$–165° C. | — | 20.7 |
| 165° C.–343° C. | — | 61.8 |
| 343° C.+ | 100 | 9.8 |
| Pour Point (°C.): | | |
| 165° C.–343° C. | — | −55 |
| 343° C.+ | 180 | 30 |
| 343° C.+ V.I. | — | 106 |

The results above show that the present process is capable of converting the Fischer-Tropsch heavy ends to more valuable distillate and gasoline range products which have a low pour point while, at the same time, reducing the pour point of the residual heavy fractions. The high viscosity index of the remaining heavy fraction indicates its paraffinic nature and its suitability as a lube feedstock.

We claim:

1. A process for upgrading the heavy oil fraction produced by syntheses of the Fischer-Tropsch type, said fraction having an initial boiling-point of at least about 125° C., said process comprising contacting the fraction and hydrogen gas under a combination of conversion conditions including a temperature of about 200° C. to 500° C., a hydrogen partial pressure of about 500 kPa to 20,000 kPa, and a liquid hourly space velocity of about 0.1 to 20, with a catalyst comprising zeolite beta composited with a hydrogenation metal said combination of conditions being effective to form a product that contains a hydrocarbon distillate fraction and a paraffin-type heavy hydrocarbon fraction suitable for conversion to lubricant oil.

2. A method according to claim 1 which the silica:alumina ratio of the zeolite is at least 50:1.

3. A method according to claim 2 in which the silica:alumina ratio of the zeolite is at least 100:1.

4. A method according to claim 1 in which the hydrogenation component is based upon a metal or metals of Group VA, VIA, VIIA, VIIIA, IB, IIB or IVB of the Periodic Table.

5. A method according to claim 1 in which the heavy oil fraction comprises a fraction boiling above 174° C.

6. A method according to claim 5 in which the heavy oil fraction comprises a fraction boiling above 343° C.

7. A method according to claim 6 in which the fraction boiling above 343° C. is converted to a distillate fraction boiling below 343° C.

8. A method according to claim 6 in which the fraction boiling above 343° C. is converted to a distillate fraction boiling below 343° C. and a lube oil fraction boiling above 343° C.

9. A method according to claim 6 in which the unconverted fraction boiling above 343° C. is recycled.

10. A method according to claim 1 in which the heavy oil fraction is contacted with the catalyst at a temperature of 300° to 425° C., a pressure of 7000 to 20000 kPa, a space velocity of 0.1 to 10 in the presence of hydrogen.

11. A method according to claim 1 in which the heavy oil fraction is passed through a guard chamber to remove contaminants associated with the conversion of the synthesis gas.

12. A method of upgrading heavy oil fraction boiling above about 150° C. produced by a Fischer-Tropsch conversion of synthesis gas to liquid product, the method comprising contacting said heavy oil fraction and hydrogen under conversion conditions including a temperature of about 200° C. to 500° C. and a liquid hourly space velocity of about 0.1 to 20 with a metal-containing conversion catalyst comprising a large pore crystalline aluminosilicate having a silica to alumina ratio of at least 10:1 and selected from the group consisting of zeolite beta, dealuminized ZSM-20 and dealuminized Y, said conversion conditions being effective to convert a substantial portion of said heavy oil to a distillate boiling range product and a lubricant base stock.

13. A method according to claim 12 in which the crystalline aluminosilicate has a silica:alumina ratio of at least 50:1.

14. A method according to claim 12 in which the distillate boiling range product has a pour point below −18° C.

15. A method according to claim 12 in which the distillate boiling range product has a pour point below −45° C.

16. A method according to claim 12 in which the lubricant product has a pour point below 0° C.

* * * * *

UNITED STATES PATENT AND TRADEMARK OFFICE
CERTIFICATE OF CORRECTION

PATENT NO. : 4,500,417
DATED : February 19, 1985
INVENTOR(S) : Nai Y. Chen, Werner O. Haag, Tracy J. Huang & Stephen S. Wong It is certified that error appears in the above-identified patent and that said Letters Patent are hereby corrected as shown below:

Col. 12, line 15, "claim 1 which" should read —claim 1 in which—.

Signed and Sealed this

Twenty-fifth Day of June 1985

[SEAL]

Attest:

DONALD J. QUIGG

Attesting Officer     Acting Commissioner of Patents and Trademarks